United States Patent
Li et al.

(10) Patent No.: US 11,388,134 B2
(45) Date of Patent: Jul. 12, 2022

(54) WIRELESS NETWORK-BASED VOICE COMMUNICATION SECURITY PROTECTION METHOD

(71) Applicant: National Cheng Kung University, Tainan (TW)

(72) Inventors: Jung-Shian Li, Tainan (TW); I-Hsien Liu, Tainan (TW); Keng-Hao Chang, Tainan (TW); Kuan-Chu Lu, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 122 days.

(21) Appl. No.: 16/885,552

(22) Filed: May 28, 2020

(65) Prior Publication Data

US 2021/0067478 A1    Mar. 4, 2021

(30) Foreign Application Priority Data

Sep. 3, 2019    (TW) .................... 108131765

(51) Int. Cl.
| | |
|---|---|
| *H04L 61/103* | (2022.01) |
| *H04L 101/622* | (2022.01) |
| *H04L 43/0829* | (2022.01) |
| *H04W 84/12* | (2009.01) |
| *H04W 8/26* | (2009.01) |

(52) U.S. Cl.
CPC ........ *H04L 61/103* (2013.01); *H04L 43/0829* (2013.01); *H04L 61/6022* (2013.01); *H04W 8/26* (2013.01); *H04W 84/12* (2013.01)

(58) Field of Classification Search
CPC . H04L 43/0829; H04L 43/0852; H04L 43/16; H04L 43/50; H04L 61/103; H04L 61/6022; H04W 84/12; H04W 8/26
See application file for complete search history.

(56) References Cited

U.S. PATENT DOCUMENTS

| | | | |
|---|---|---|---|
| 7,009,984 B2 | 3/2006 | Watson | |
| 7,127,524 B1 * | 10/2006 | Renda | H04L 29/12 |
| | | | 709/245 |
| 7,620,070 B1 | 11/2009 | Maufer et al. | |
| 8,503,340 B1 | 8/2013 | Ku | |

(Continued)

FOREIGN PATENT DOCUMENTS

| | | |
|---|---|---|
| CN | 101060552 A | 10/2007 |
| CN | 107979503 A | 5/2018 |

*Primary Examiner* — Saad A. Waqas
(74) *Attorney, Agent, or Firm* — Locke Lord LLP; Tim Tingkang Xia, Esq.

(57) ABSTRACT

A wireless network-based voice communication security protection method, which enables VoWiFi (Voice over Wi-Fi) to verify and prevent potential risks in communication, and secures the environment of network communications that can be verified by a user device. A real-time user interface indicates security and quality of the current network call and provides advice on when to cancel a call. A telecommunications provider side interface checks if the user's network communication environment is safe, and provides real-time recommendations to the user regarding the security status of the call. The user device side self-check interface and the telecommunications provider side detection interface simultaneously detect whether or not the user's network communication environment is secure.

9 Claims, 2 Drawing Sheets

(56) References Cited

U.S. PATENT DOCUMENTS

| | | | |
|---|---|---|---|
| 2001/0055311 A1* | 12/2001 | Trachewsky | H04L 1/0006 370/445 |
| 2002/0061012 A1* | 5/2002 | Thi | H04M 7/125 370/352 |
| 2008/0262863 A1* | 10/2008 | Stickley | H04L 63/0227 705/1.1 |
| 2014/0086134 A1* | 3/2014 | Smadi | H04L 67/104 370/312 |
| 2016/0044065 A1* | 2/2016 | Zhu | H04M 5/18 370/329 |
| 2017/0195259 A1* | 7/2017 | Florea | H04L 69/22 |
| 2017/0339124 A1* | 11/2017 | Karlsson | H04W 12/062 |
| 2018/0020393 A1* | 1/2018 | Karlsson | H04M 3/2281 |
| 2019/0058731 A1* | 2/2019 | Garg | H04L 61/007 |

\* cited by examiner

WIRELESS NETWORK-BASED VOICE COMMUNICATION SECURITY PROTECTION METHOD

CROSS REFERENCE TO RELATED APPLICATIONS

The non-provisional application claims priority to Taiwan Patent Application No. 108131765, filed on Sep. 3, 2019, the content thereof is incorporated by reference herein.

BACKGROUND OF THE INVENTION

Field of the Invention

The present invention relates to the security protection of voice communication on wireless networks, and more particularly to a user device or a telecommunications provider detecting a call through a VoWiFi (Voice over Wi-Fi) network and securing the network communication environment.

Description of the Prior Art

In recent years, voice communication technology has become mature. With the spread of information increasing, information security has become a very important issue. In modern society, the mobile phone has become a universally utilized communication device. Whether the mobile phone is used for communication, shopping, leisure, or entertainment, the functions are inseparable from the usage of the mobile phone. Therefore, the safety of mobile phone communication is now a major issue of concern in society.

The existing mobile phones using VoWiFi can be connected to a telecommunications network via Wi-Fi to make calls. Compared with the free communication software applications, it is less affected by network choke and delay, and there is no need to download a corresponding application (App). As long as there is Wi-Fi, the user can dial directly. In areas where the telecommunications network doesn't cover or the signal is weak, such as suburbs or mountain areas, the user can also use Wi-Fi to make calls, and even call abroad. When calling, the user can also make a call via VoWiFi, which can save expensive roaming charges.

Currently, in the era of 4G and even into the future 5G era, the coverage area of telecommunication networks under the various telecommunications companies is not complete and the coverage is limited, making network signals often unstable. However, existing devices that can use VoWiFi cannot effectively prevent common network attacks, such as ARP attacks, man-in-the-middle attacks, address resolution protocol spoofing, etc. When Wi-Fi signal strength is sufficient, the VoWiFi function can be turned on automatically and there is no detection mechanism to evaluate or detect whether the environment is safe. Also, the telecommunications provider will not monitor whether the connection quality is normal when the VoWiFi call function is turned on.

It can be seen that there are disadvantages in the prior art that need to be improved.

Therefore, since VoWiFi is bound to be the future trend, how to ensure the security and confidentiality of users when making network calls, and at the same time simultaneously detecting whether the communication network is secure for Internet calls, remains a security problem that still needs to be overcome with technology and solutions.

SUMMARY OF THE INVENTION

In view of this, an objective of the present invention is to detect the environment of the network call through a user side detection interface or a telecommunication service provider side detection interface when VoWiFi is used for network calls so that a more efficient call network and security call environment are provided.

In order to achieve the above objective and more, the present invention provides a wireless network-based voice communication security protection method, which comprises:

Step 1. Initially, the user can choose to use the user side self-check interface for testing, or choose to use the telecommunications provider side detection interface for testing, or can use both the user self-check interface and the telecommunications provider side detection interface for testing;

Step 2. If the user side self-checking interface is used for detection, it will automatically determine whether or not it is connected to a wireless network. If not, it will automatically or manually select another network connection and re-determine whether or not it is connected to a wireless network;

Step 3. If yes, obtain a wireless network card gateway Media Access Control (MAC) address;

Step 4. Set the counter to 0 (i=0);

Step 5. The counter adds 1 (i+1) after receiving the network packet;

Step 6. Determine whether the source of the packet is the MAC address of the wireless network card gateway;

Step 7. If not, add a 1 (i+1) to the counter after receiving the network packet. If yes, determine whether there is a MAC address stored;

Step 8. If yes, determine whether the MAC address of the packet is the same as the MAC address of the last packet; if not, store the MAC address and execute a determination whether the counter is greater than or equal to ($\geq$) a set value threshold;

Step 9. If it is determined that the MAC address of the packet is not the same as the MAC address of the previous packet, a warning will pop up and return to the automatic or manual selection of another network connection. If yes, determine whether the counter is greater than or equal to ($\geq$) a set value threshold;

Step 10. If not, return to the counter and add 1 after receiving the network packet. If yes, send an Address Resolution Protocol (ARP) to request the MAC address of the gateway; and Step 11. Automatically set the counter to zero.

In an embodiment of the present invention, the user self-checking interface comprises a mobile device application or a mobile application (APP) provided on the mobile device.

In an embodiment of the present invention, the user self-checking interface has a wireless local area network interface (Wi-Fi), and can scan the connection status through the wireless network interface to confirm safety.

In an embodiment of the present invention, the set threshold value is 0-99999, and can be set by the user.

In an embodiment of the present invention, in step 11, when the counter exceeds a set threshold value set by the user, it will automatically return to 0 and re-count.

In an embodiment of the present invention, the detecting by the telecommunication provider side detection interface comprises:

Step 1. Determine whether it is connected to the telecommunications network;

Step 2. If yes, determine whether or not the packet delay and packet loss rate of the voice packet are greater than the set threshold and whether the packet delay and packet loss rate of the Voice over Wi-Fi (VoWiFi) packet are greater than the set value threshold.

Step 3. If both are true, notify the user device to redial through the telecommunication network. If both are not, continue to observe and re-determine whether the packet delay and packet loss rate of the voice packet are greater than the set value threshold and whether the packet delay and packet loss rate of the VoWiFi packet are greater than the set threshold;

Step 4. If not, determine whether the packet delay and packet loss rate of the voice packet are greater than the set threshold and whether the packet delay and packet loss rate of the VoWiFi packet are greater than the set threshold.

Step 5. If both are no, continue to monitor and re-judge whether the packet delay and packet loss rate of the voice packet are greater than the set threshold and whether the packet delay and packet loss rate of the VoWiFi packet are greater than the set threshold;

Step 6. If the voice packet is YES, prompt to cancel the call and end the detection; and Step 7. If the VoWiFi packet is YES, automatically change the VoWiFi packet size, and re-judge whether the packet delay and packet loss rate of the VoWiFi packet are greater than a set threshold.

In an embodiment of the present invention, the threshold value of the packet loss rate of the voice packet is a threshold value that is greater than or equal to ($\geq$) per second, where the threshold value is $10^{-2}$.

In an embodiment of the present invention, the threshold value of the packet loss rate of the VoWiFi packet is a threshold value that is greater than or equal to ($\geq$) per second, where the threshold value is $10^{-6}$.

In an embodiment of the present invention, the threshold value of the packet delay of the voice packet and the VoWiFi packet is an interval time setting value, wherein the unit of the time setting value is seconds (s).

In an embodiment of the present invention, the prompt of canceling the call in step 6 is a prompt to suggest canceling the call when the call does not reach the set call standard.

In an embodiment of the present invention, the interval time setting value is 1 to 999 seconds.

DESCRIPTION OF THE PREFERRED EMBODIMENTS

In order to understand the technical features, content, and advantages of the present invention and the effects that can be achieved, the present invention is described in detail with the accompanying drawings in the form of examples. The drawings are only for illustration and supplementary description, and not limiting the actual proportion and precise configuration after the implementation of the invention.

Figure 1:
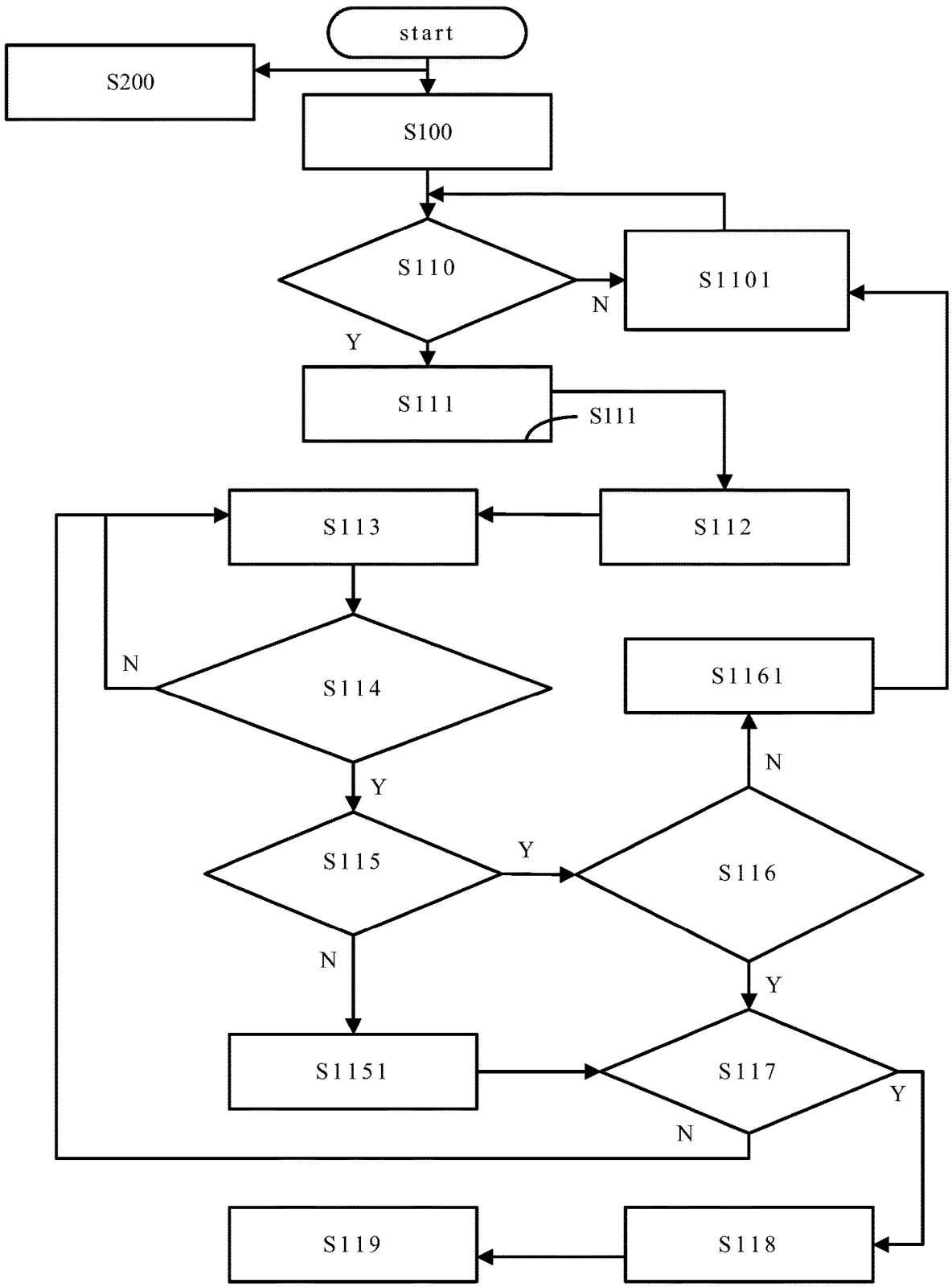
FIG. 1 is a user device side detection interface flowchart of a wireless network-based voice communication security protection method according to an embodiment of the present invention.

Refer to FIG. 1, which is a flowchart of a user device side detection interface of the wireless network-based voice communication security protection method of the present invention, which comprises:

Step 1. Initially, the user can choose to perform the test with the user side self-check detection interface (S100), or select the telecommunication provider side detection interface to perform the test (S200), or can choose to use both the user side self-check interface and the telecommunication provider side detection interface for testing;

Step 2. If the user device side self-checking interface is used for detection, it will automatically determine whether or not it is connected to a wireless network (S110). If not, then automatically or manually select another network connection (S1101) and re-determine if it is connected to a wireless network (S110);

Step 3. If yes, obtain the media access control (MAC) address of the wireless network card gateway (S111);

Step 4. (S112) Set the counter to 0 (i=0);

Step 5. (S113) The counter adds 1 (i+1) after receiving the network packet;

Step 6. Determine whether or not the source of the packet is the MAC address of the wireless network card gateway (S114);

Step 7. If not, return to the counter and add 1 (i+1) after receiving the network packet (S113). If yes, determine whether the MAC address is stored (S115);

Step 8. If yes, then determine whether or not the packet MAC address is the same as the MAC address of the previous packet (S116). If not, then store the MAC address (S1151) and execute to determine whether the counter is greater than or equal to ($\geq$) a set value threshold (S117);

Step 9. If determined that the packet MAC address is not the same as the MAC address of the previous packet (S116), then prompt with a warning (S1161) and return to automatically or manually select another network connection (S1101), if yes, it is determined whether or not the counter is greater than or equal to ($\geq$) a set threshold value (S117);

Step 10. If not, return to (S113) and add 1 after receiving the network packet. If yes, then send an Address Resolution Protocol (ARP) requesting the MAC of the gateway address (S118); and Step 11. (S119) The counter is automatically set to 0.

It can be known from the above steps that the user can choose to perform the detection through the user device side self-check interface or the telecommunications provider side detection interface. The user side interface is a mobile device application or a mobile application (APP) provided on the mobile device. The user self-check interface will detect whether or not it is connected to Wi-Fi first, and scan the connection status through the wireless network interface to confirm it is secure. When Wi-Fi is not connected, it will automatically or manually select the nearby wireless network name (SSID) for connection. After connecting to Wi-Fi, it will obtain the wireless network card gateway Media Access Control (MAC) address, and set the counter to 0 (i=0), and the counter will increase by 1 (i+1) in every network packet is received. At this time, the device will automatically start monitoring the packet and record the source MAC address of the first incoming packet. Next, the packets received by the device are transmitted by the gateway, so the MAC address is the same, and the MAC address of the source packet is continuously compared. If it is judged that the MAC address of the source packet is the same as the MAC address of the previous packet, it is determined whether or not the counter is larger or equal to (≥) a set threshold value. If it is determined that the MAC address of the source packet is not the same as the MAC address of the previous packet, a warning will pop up and return to automatically or manually selecting another network connection. When the counter is less than the set threshold value, continue to make the counter add 1 after receiving the network packet, and when the counter is greater than or equal to (≥) a set threshold value, it sends an Address Resolution Protocol (ARP) requesting the MAC address of the gateway. The counter automatically sets the counter to 0, that is, when an ARP attack occurs, the source MAC address transmitted from the source packet to the device will change, and a warning will pop up when the change occurs, informing the user that the environment is not safe, and advise users to change the connected Wi-Fi.

In order to avoid the packets received at the beginning are packets sent by an attacker. Then it will automatically force an ARP request to the gateway, so that the gateway will tell the device the correct MAC address after receiving the request. An attacker may intercept the ARP request sent, so the method will use a counter to prevent it, and set the counter to a set threshold value. The ARP request will be sent after every 10,000 packets, and when the counter exceeds the user's set threshold value the counter will be automatically returned to 0 and counting resumes. At the same time, the set threshold value is 0-99999 and can be set by the user. The time for receiving every 10,000 packets is random and involves the CPU. The usage rate and network delay make it difficult for attackers to discover the ARP requests sent and prevent this security mechanism from being discovered by attackers.

Figure 2:
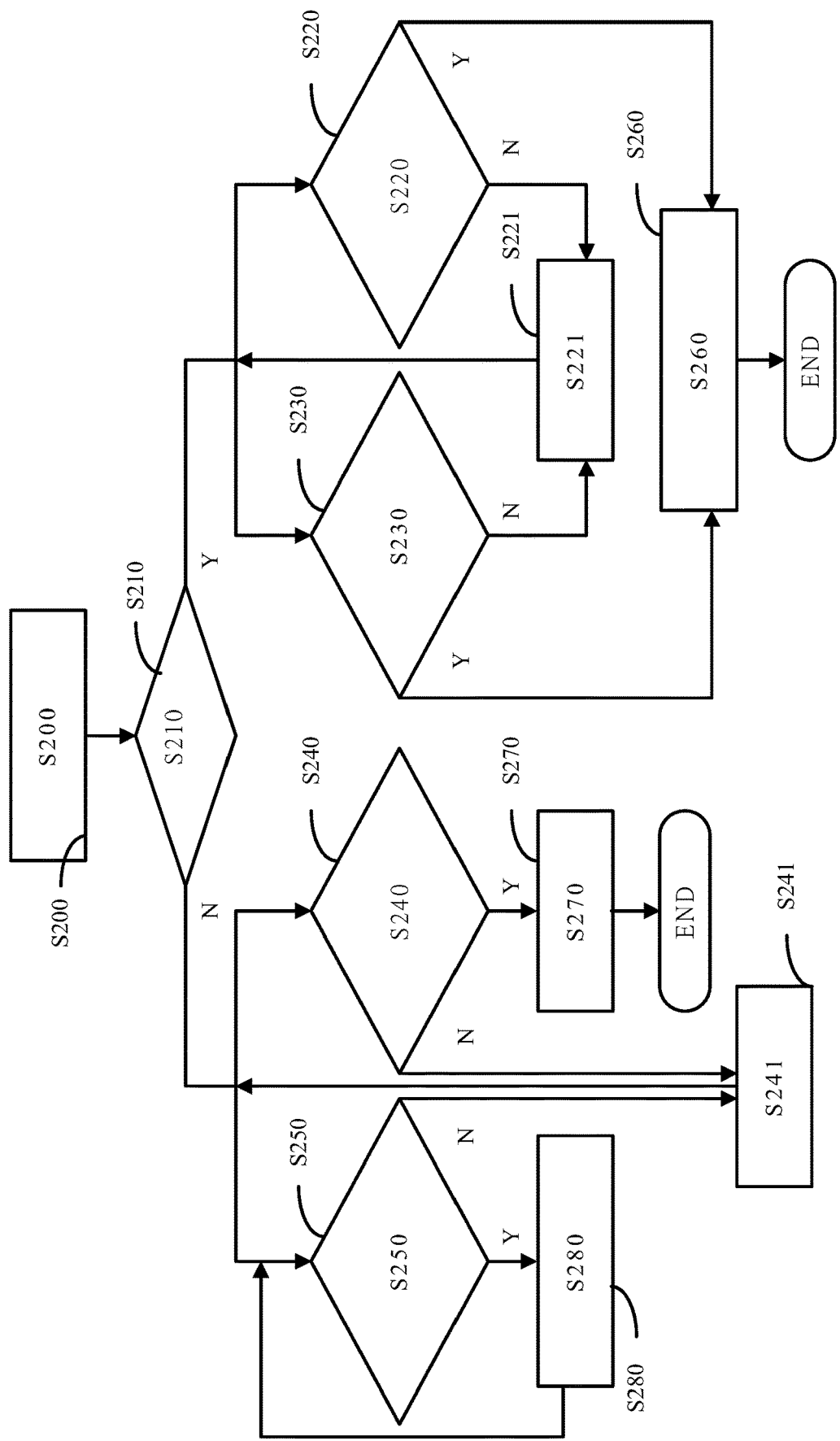
FIG. 2 is a flowchart of a telecommunication provider side detection interface of a wireless network-based voice communication security protection method according to an embodiment of the present invention.

Refer to FIG. 2, which is a flowchart of a telecommunication provider side detection interface of the wireless network-based voice communication security protection method of the present invention. The detection is performed by the telecommunications provider side detection interface (S200) which comprises:

Step 1. Determine whether or not the telecommunication network is connected (S210);

Step 2. If yes, simultaneously determine whether or not the packet delay and packet loss rate of the voice packet are greater than the set threshold (S220) and whether or not the loss rate and the packet delay of the Voice over Wi-Fi (VoWiFi) packet is greater than a set threshold (S230);

Step 3. If both are yes, then notify the user device to redial through the telecommunication network (S260). If not, then continue to observe (S221) and re-determine the packet delay and packet loss rate of the voice packet is greater than the set threshold (S220) and whether or not the packet delay and packet loss rate of VoWiFi packets is greater than the set threshold (S230). If any of them is not, then continue to observe and re-determine (S221);

Step 4. If it is not, the telecommunication network is disconnected, and at the same time, determine whether or not the packet delay and packet loss rate of voice packets are greater than the set threshold (S240) and determine whether or not the packet delay and packet loss rate of the VoWiFi packets are greater than the set threshold (S250);

Step 5. If both are negative, (S241) continue to monitor and re-determine whether or not the packet delay and packet loss rate of the voice packet are greater than the set threshold (S240) and re-determine whether or not the packet delay and packet loss rate of the VoWiFi packet are greater than the set threshold (S250);

Step 6. If the voice packet is YES (S240), then prompt to cancel the call and end the detection (S270); and Step 7. If the VoWiFi packet is YES (S250), then automatically change the VoWiFi packet size (S280) and re-determine whether or not the packet delay and packet loss rate of the VoWiFi packet are greater than the set threshold (S250).

In summary, when a user uses VoWiFi communication, the user device automatically or the user selects the telecommunications provider side detection interface for detection. The telecommunications provider will determine whether the user is connected to the telecommunications provider network of the base station. If it is connected to the telecommunication provider's network, the internal device of the telecommunication provider will automatically determine whether the packet delay and packet loss rate of the user's voice packet or VoWiFi packet meet the set thresholds required by the telecommunication network.

The packet loss rate and packet delay of the voice packet and the packet loss rate and packet delay of the VoWiFi packet needs to be greater than or equal to (≥) per second, where, the threshold value of the packet loss rate of the voice packet is $10^{-2}$, the threshold value of the packet loss rate of the VoWiFi packet is a threshold value that is greater than or equal to (≥) per second, where the threshold value is $10^{-6}$.

The thresholds are interval time settings, where the unit of the time setting value is seconds (s), and the interval time setting value is 1~999 seconds, and is a certain period of time what percentage of voice packets need to be correctly transmitted to the destination.

If it is determined that both are greater than or equal to (≥) the set threshold, it will notify the user and the user's device re-dials through the telecommunications network. If both are less than the set threshold, that is, when the telecommunications provider detects that the voice packet does not reach the set threshold, the telecommunications provider will continue to observe and re-determine if the user is not connected to the telecommunication business network. The internal device of the telecommunication provider will automatically determine whether the packet delay and packet loss rate of the user's voice packet or VoWiFi packet meet the set thresholds required by the telecommunication network. That is if the packet delay and packet loss rate of the voice packet are greater than or equal to (≥) a set threshold.

The user is prompted to cancel the call, helping the user to save unnecessary costs if it is less than the set threshold. The telecommunications provider will continue to monitor and re-determine if the packet delay and packet loss rate of VoWiFi packets are less than the set threshold. The telecommunications provider will continue to monitor and re-determine if the packet delay and packet loss rate of VoWiFi packets are greater than or equal to (≥) set thresholds. The telecommunications provider will automatically change the VoWiFi packet size, making it difficult for ARP attackers to accurately discard them. Packets of a certain size are continuously monitored afterward.

As can be seen from the above, the user can set and choose to use the user device side self-checking interface to perform the detection or choose to use the telecommunications provider side detection interface to perform the detection or choose both to simultaneously detect the network communication to secure the environment and check the quality of the user's use. In the case of a connected network call, when the VoWiFi packet does not reach the set threshold, the telecommunications provider will notify the user device to re-dial or cancel the call through the telecommunications network, and protection measures can be immediately implemented to protect the user and avoid serious damage when attacked by ARP attackers.

In summary, the security protection method of the present invention can be preset by the user in advance, and the user can select a user self-check interface or a telecommunications provider's detection interface or a simultaneous environment detection for network calls. As a result, the method prevents ARP attackers from accurately discarding packets of a specific size, thereby successfully protecting the environment and quality of user network calls.

As can be seen from the foregoing implementation description, compared with the prior art and products, the present invention has the following advantages:

1. The wireless network-based voice communication security protection method of the present invention can be a mobile device application or a mobile application (APP) on the mobile device and comprises a user side self-checking interface, and also has a WiFi interface, and can scan the wireless network through the WiFi interface, and confirms the security of its network call environment.

2. The wireless network-based voice communication security protection method of the present invention can be implemented by using the related record analysis originally set in the telecommunication provider side, and at the same time, providing the user side real-time security assessment and messaging.

3. The wireless network-based voice communication security protection method of the present invention can be set by the user in advance and the user can select to detect by the user side self-checking interface, or select to be detected by a telecommunications provider side detection interface, or can select to simultaneously perform detection through the user side self-checking interface and the telecommunication provider side detection interface. The user device obtains the security assessment information provided by the telecommunication provider side in real-time.

Specifically, in the present invention, the user can select the detection interface by themselves and can immediately receive relevant network call environment security assessment messages to the user device or from the telecommunications provider at the same time, thereby avoiding attacks when using VoWiFi from external ARP attackers during network calls and ensures the security and quality of the network call environment.

The above description is only the best embodiment of the present invention, but the structural features of the present invention are not limited to this description. Any person skilled in the art can easily think of changes or modifications in the field of the present invention. Both are covered by the patent scope of the present invention.

The present invention provides an unprecedented innovative structure that has not been seen in any publications and there are no similar products on the market. Therefore, it should be considered with its novelty. In addition, the unique features and functions of the present invention are far from comparable to conventional ones, so it is indeed more progressive than conventional ones, and it complies with the requirements of patent law concerning the requirements for application for invention patents.

What is claimed is:

1. A wireless network-based voice communication security protection method comprising:
choosing, by a user, to perform detection using a user device self-checking interface of a user device, or to perform the inspection using a telecommunication provider side detection interface, or to perform the inspection using both the user device self-checking interface and the telecommunication provider side detection interface;
automatically determining whether or not the user device is connected to a wireless network if the user device self-checking interface is chosen for detection;
automatically or manually selecting another network connection to connect, if the user device is not connected to the wireless network;
re-determining if the user device is connected to the wireless network;
if the user device is connected, obtain a media access control (MAC) address of a wireless network card gateway;
setting a counter to 0 (i=0);
adding 1 (i+1) to the counter after receiving a network packet;
determining whether or not a source address of the network packet is the same as the MAC address of the wireless network card gateway;
adding 1 (i+1) to the counter after receiving the network packet if the source address of the network packet is not the same as the MAC address of the wireless network card gateway;
determining whether or not the MAC address of the wireless network card gateway is stored if the source address of the network packet is the same as the MAC address of the wireless network card gateway;
determining whether or not the source address of the network packet being the MAC address of the wireless network card gateway is the same as a previously stored MAC address corresponding to a previous packet if the MAC address of the wireless network card gateway is stored;
storing the MAC address of the wireless network card gateway if the MAC address of the wireless network card gateway is not stored;
prompting with a warning and automatically or manually selecting another network connection, if the source address of the network packet being the MAC address of the wireless network card gateway is not the same as the previously stored MAC address corresponding to the previous packet;
determining whether or not the counter is greater than or equal to (≥) a set threshold value, wherein the set threshold value is 0-99999 and is set by the user;
adding 1 to the counter after receiving the network packet, if the counter is not greater than or equal to (≥) a set threshold value;
sending an Address Resolution Protocol (ARP) requesting the MAC address of the gateway, if the counter is greater than or equal to (≥) a set threshold value; and
automatically resetting the counter to 0.

2. The wireless network-based voice communication security protection method of claim 1, wherein the user device self-checking interface comprises a mobile device application or a mobile program application installed on the mobile device.

3. The wireless network-based voice communication security protection method of claim 1, wherein the user device self-checking interface has a wireless local area network interface (Wi-Fi), and scanning connection status through the wireless local area network interface confirms network security.

4. The wireless network-based voice communication security protection method of claim 1, wherein when the counter exceeds the set threshold value, the counter automatically resets to 0 and restarts counting.

5. The wireless network-based voice communication security protection method of claim 1, wherein the telecommunication provider side detection interface for detection comprises:
   determining whether or not a telecommunication network is connected;
   simultaneously determining whether or not packet delay and packet loss rate of a voice packet are greater than the set threshold value and determining whether or not packet delay and packet loss rate of a Voice over Wi-Fi (VoWiFi) packet are greater than the set threshold value if the telecommunication network is connected;
   notifying the user device to redial through the telecommunication network, if both packet delay and packet loss rate of the voice packet are greater than the set threshold value and packet delay and packet loss rate of the Voice over Wi-Fi (VoWiFi) packet are greater than the set threshold value;
   re-determining whether or not the packet delay and the packet loss rate of the voice packet are greater than the set threshold value and whether or not the packet delay and the packet loss rate of the VoWiFi packet are greater than the set threshold value if both packet delay and packet loss rate of the voice packet and packet delay and packet loss rate of the Voice over Wi-Fi (VoWiFi) packet are not greater than the set threshold value;
   prompting the user device to cancel the call and end detection if the packet delay and the packet loss rate of the voice packet are greater than the set threshold value;
   automatically changing the size of the VoWiFi packet if the packet delay and the packet loss rate of the VoWiFi packet are greater than the set threshold value; and
   re-determining whether or not the packet delay and the packet loss rate of the VoWiFi packet are greater than a set threshold value.

6. The wireless network-based voice communication security protection method of claim 5, wherein the packet loss rate of the voice packet is greater than or equal to ($\geq$) per second, where the threshold value is $10^{-2}$.

7. The wireless network-based voice communication security protection method of claim 5, wherein the packet loss rate of the VoWiFi packet is greater than or equal to ($\geq$) per second, where the threshold value is $10^{-6}$.

8. The wireless network-based voice communication security protection method of claim 5, wherein the set threshold value of the packet delay of the voice packet and the packet delay of the VoWiFi packet is an interval time setting value in seconds(s).

9. The wireless network-based voice communication security protection method of claim 5, wherein the user receives a prompt to cancel the call when the call does not meet call standards.

* * * * *